United States Patent Office 3,505,687
Patented Apr. 14, 1970

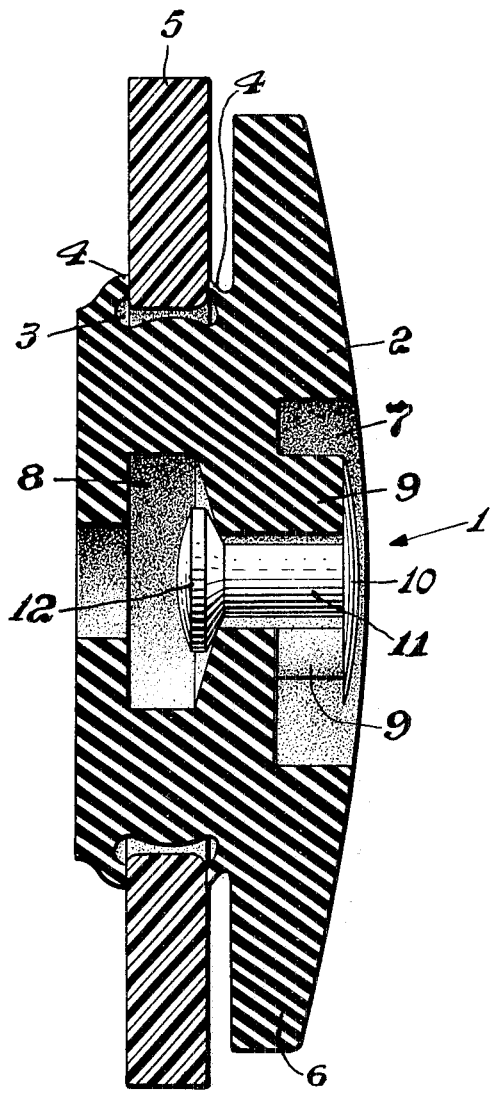

3,505,687
VALVE ARRANGEMENT FOR AN ARTIFICIAL LIMB
Jan Prahl, Weiler zum Stein, near Winnenden, Germany, assignor to Wilhelm Julius Teufel, Stuttgart, Germany, a limited-liability company of Germany
Filed Jan. 11, 1968, Ser. No. 697,167
Claims priority, application Germany, Jan. 26, 1967, T 22,004
Int. Cl. A61f 1/02
U.S. Cl. 3—17                              5 Claims

ABSTRACT OF THE DISCLOSURE

A valve arrangement for the hollow shaft of an artificial limb in which a plug is releasably secured in an opening of a rigid support, and a passage in the plug is normally blocked by a manually operable valve. The inner edge of the support is resiliently sealed between the free annular rims of two radially projecting and axially spaced annular lips on the plug, defining therebetween a groove whose bottom has a smaller cross section than the opening in the support, whereby the plug is readily inserted and removed, yet tightly sealed to the support when inserted.

BACKGROUND OF THE INVENTION

This invention relates to artificial limbs, and particularly to a valve arrangement in the shaft of such a limb, which permits the shaft cavity to be vented to the atmosphere.

Before a stump of a natural limb is to be inserted into the shaft cavity of an artificial limb of the type with which this invention is mainly concerned, a stockinette is pulled over the stump and is withdrawn after stump insertion through an opening in the shaft. The opening thereafter is releasably closed with a plug. A valve which normally blocks a passage in the plug permits the space sealed in the shaft by the stump to be vented as needed to adjust the normal pressure differential between the air in the space and the ambient atmosphere.

The plug must be tightly sealed in the shaft opening to maintain this pressure differential which is essential for holding the artificial limb on the stump, and known plugs are shaped somewhat like bottle stoppers. They rely for tight seating in the shaft opening on their resiliency, on a conically tapering shape of their circumferential wall, and on the relatively great axial height of that wall which frictionally engages the shaft of a supporting ring fastened to the shaft about the opening.

The known plugs require substantial force for insertion and even greater force for removal. Because of their necessary axial length, they project from the shaft and tend to snag clothing worn over the artificial limb.

The object of the invention is the provision of a valve arrangement of the type described whose plug is tightly sealed to the shaft when inserted, yet can be removed and re-inserted with a minimum of effort. It is another object of the invention to provide a valve arrangement whose axial length can be reduced to prevent snagging.

SUMMARY OF THE INVENTION

According to this invention the plug is provided with two axially spaced annular lips of yieldably resilient material which radially project from the plug proper and define an annular groove therebetween. The groove has an annular bottom about the plug axis and a cross section smaller than that of the opening which is to be sealed by the plug. Each lip has an annular base portion fastened to the plug proper, and an annular free rim portion spaced from the plug in a radially outward direction. When the lips are in their relaxed condition, the rim portion of at least one lip is axially offset from the associated base portion inward of the groove toward the other rim portion, and the axial spacing of the rim portions is smaller than the axial thickness of the annular edge about the opening in the shaft. In the normal operating position of the plug, this edge is sealingly received between the rim portions of the lips but clears the bottom of the groove, thereby securing the plug in the shaft opening.

Only the thin lips need be bent for releasing the plug or for again inserting it. The force required is minimal. Yet, the seal between the plug and the shaft is airtight, and does not depend for tightness on the axial length of the plug which may therefore be made quite low.

Other features, additional objects, and many of the attendant advantages of this invention will be readily apparent from the following description of a preferred embodiment when considered in connection with the appended drawing.

BRIEF DESCRIPTION OF THE DRAWING

The sole figure of the drawing shows a valve arrangement of the invention in axial section.

DESCRIPTION OF THE PREFERRED EMBODIMENT

The illustrated valve arrangement includes a metallic valve member 1, a rubber plug 2, and a flat support ring 5 of rigid plastic. The ring 5 is normally cemented to the shaft of an artificial limb about an opening in the same to form a well defined inner edge about the opening.

The inner circular edge of the ring 5 is received in a circumferential groove 3 between two integral resilient lips 4 which project radially from the main body of the plug 2 and are slanted toward each other in such a manner that the narrow free rim portions of the lips are axially offset toward each other relative to the corresponding, relatively wide base portions of the same.

The edge of the ring 5 is engaged by the rim portions of the lips 4 under the resilient pressure of the outwardly tapering lips. It will be understood that the axial spacing of the rim portions is even smaller in the relaxed condition of the lips 4 than the illustrated spacing. The diameter of the opening in the ring 5 is larger than the diameter of the circularly annular bottom of the groove 3. The resulting clearance between the groove bottom and the inner edge of the ring 5 facilitates removal of the plug 2 from the opening in the ring 5, and later re-insertion of the plug.

The portion 6 of the plug 2 which projects from the ring 5 outward of the artificial limb in the normal operating condition of the valve arrangement is radially enlarged to form a disc-shaped handle by means of which the plug 2 may be removed and reinserted. The handle 6 is axially spaced from the lips 4 so as not to interfere with the sealing function of the latter.

A central axial passage through the plug 2 connects an outwardly open recess 7 in the handle portion 6 with a chamber 8 in the plug 2. Three integral bosses 9 circumferentially spaced about the plug axis extend from the plug body into the recess 7.

The unitary valve member 1 has a flat button portion 10 which abuts against the bosses 9 from the outside, a stem portion 11 received with ample radial clearance in the axial passage of the plug 2, and a conically tapering valve body portion 12 which blocks an orifice of the axial passage in the chamber 8. When it is desired to vent the space between the stump and the artificial limb, the button portion 10 is pressed axially inward against the resilient resistance of the bosses 9, whereby the valve body 12 is lifted from the wall of the chamber 8 and air may flow through the axial passage in the plug 2 and radially between the bosses 9.

The overall axial length of the plug 2 is only slightly greater than the radius of the opening in the ring 5. The plug projects outward from the ring only as far as is needed to provide the handle portion 6. If the ring is mounted in a recess of the artificial limb, as is customary, the plug does not project beyond the outer surface of the limb.

The air pressure in the space between the stump and the artificial limb is normally lower than that of the ambient atmosphere. The lip 4 near the handle portion 6 is therefore forced by atmospheric pressure against the edge of the ring 5, and it has been found that the tightness of the seal between the ring 5 and the plug 2 increases as the pressure differential between the atmosphere and the cavity in the shaft of the artificial limb increases.

I claim:
1. In a valve arrangement for an artificial limb having annular support means, said support means having an inner annular edge portion about an opening therethrough, said opening having an axis, a plug member normally releasably secured in said opening and formed with a passage therethrough in the direction of said axis, and a valve member mounted in said passage for resiliently blocking the same, the improvement in the means for securing said plug member in said opening which comprises:
 (a) two axially spaced annular lips of yieldably resilient material radially projecting from said plug member and defining an annular groove therebetween,
  (1) the bottom of said groove being annular about said axis and having a cross section smaller than the cross section of said opening,
 (b) each lip having an annular base portion fastened to said plug member and an annular free rim portion spaced from said plug member in a radially outward direction,
  (1) at least one of said rim portions being axially offset from the associated base portion inward of said groove toward the other rim portion in the relaxed condition of said lips,
  (2) the axial spacing of said rim portions being smaller than the axial thickness of said edge portion in said relaxed condition,
 (c) said rim portions sealingly receiving said edge portion therebetween, whereby said plug member is secured in said opening.

2. In an arrangement as set forth in claim 1, said base portions being integral with said plug member, said plug member essentially consisting of said yieldably resilient material.

3. In an arrangement as set forth in claim 1, said plug member having a disc-shaped handle portion axially spaced from one of said lips in a direction away from the other lip and radially projecting beyond said rim portions.

4. In an arrangement as set forth in claim 1, said opening being circular and said bottom being circular.

5. In an arrangement as set forth in claim 1, each lip tapering from said bottom portion toward said rim portion thereof.

References Cited

UNITED STATES PATENTS 2,834,025   5/1958   Leavy _____ 3—17

FOREIGN PATENTS 650,858   10/1937   Germany.

OTHER REFERENCES

German printed application No. 1,082,702, dated June 2, 1960, Teufel.

RICHARD A. GAUDET, Primary Examiner

RONALD L. FRINKS, Assistant Examiner

U.S. Cl. X.R.

251—322